Patented Apr. 11, 1950

2,503,775

UNITED STATES PATENT OFFICE 2,503,775

PYRROLOCYANINE DYES CONTAINING A CARBOXYALKYL OR SULFOALKYL GROUP

Robert H. Sprague, Rochester, N. Y., assignor to Eastman Kodak Company, Rochester, N. Y., a corporation of New Jersey No Drawing. Application March 21, 1947, Serial No. 736,404

3 Claims. (Cl. 260—240)

This invention relates to pyrrolocyanine dyes containing a carboxyalkyl or sulfoalkyl group.

Pyrrolocyanine dyes which are useful as light-screening substances have been described in United States Patent 2,409,612, dated October 22, 1946. These pyrrolocyanine dyes while related in some respects to indole dimethinecyanine dyes (purported to have been prepared by condensing α-methylindole, diphenylformamidine and a cyclammonium quaternary salt containing a reactive methyl group, in the presence of acetic anhydride), cannot be prepared in a manner analogous to that set forth for the indole dyes.

I have now found certain new pyrrolocyanine dyes and these new dyes cannot be prepared in a manner analogous to that set forth for the aforesaid indole dyes. Morever, my new pyrrolocyanine dyes are an improvement over the pyrrolocyanine dyes known heretofore in that my new dyes are more readily soluble in mildly alkaline media.

It is, accordingly, an object of my invention to provide new pyrrolocyanine dyes. A further object is to provide a process for preparing such dyes. Still other objects will become apparent, hereinafter.

The new pyrrolocyanine dyes of my invention can be represented by the following general formulas:

I

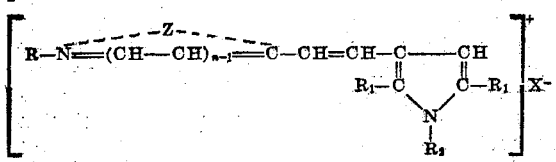

and

II

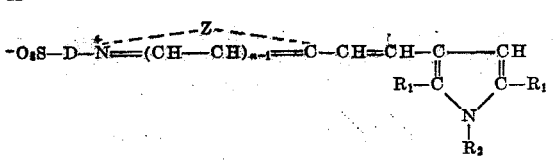

wherein R represents a carboxyalkyl group, e. g. carboxymethyl, α-carboxyethyl, β-carboxyethyl, γ-carboxypropyl, etc., $R_1$ represents an alkyl group, e. g. methyl, ethyl, etc., $R_2$ represents a member selected from the group consisting of an alkyl group and an aryl group, e. g. methyl, ethyl, decyl, lauryl, cetyl, β-ethoxyethyl, phenyl, p-chlorophenyl, etc., n represents a positive integer of from 1 to 2, X represents an anion, e. g. chloride, bromide, iodide, benzenesulfonate, p-toluenesulfonate, acetate, propionate, methylsulfate, ethylsulfate, thiocyanate, etc., D represents a divalent hydrocarbon radical, e. g. methylene, ethylene, trimethylene,

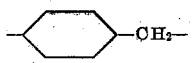

etc., and Z represents the non-metallic atoms necessary to complete a heterocyclic nucleus containing from 5 to 6 atoms in the heterocyclic ring, e. g. thiazole, 4-phenylthiazole, 4,5-diphenylthiazole, 4-methylthiazole, benzothiazole, 5-chlorobenzothiazole, 6-chlorobenzothiazole, 6-methoxybenzothiazole, 5-methylbenzothiazole, 5-methoxybenzothiazole, α-naphthothiazole, β-naphthothiazole, 4-phenyloxazole, benzoxazole, 5-methylbenzoxazole, 5-methoxybenzoxazole, 6-methoxybenzoxazole, α-naphthoxazole, β-naphthoxazole, 5-phenylbenzoxazole, benzoselenazole, 5-chlorobenzoselenazole, quinoline, 6-methoxyquinoline, 6-dimethylaminoquinoline, 6-chloroquinoline, 6-acetaminoquinoline, etc.

The dyes of this invention are prepared by condensing a pyrrole carboxaldehyde selected from those represented by the following general formula:

III

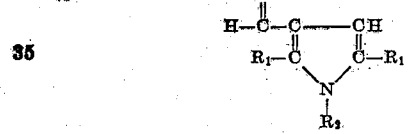

wherein $R_1$ and $R_2$ have the values given above, with a cyclammonium quaternary salt selected from those represented by the following general formulas:

IV

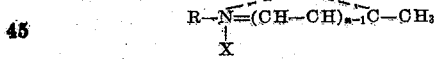

and

V

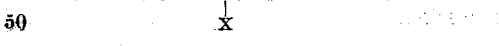

wherein R, D, n, X and Z have the values given above. The condensations involving the cyclammonium carboxyalkyl quaternary salts of Formula IV are advantageously carried out in a solvent, e. g. methyl, ethyl, n-propyl, isopropyl, isobutyl or n-butyl alcohol. The condensations involving the cyclammonium quaternary salts of Formula V are likewise advantageously carried out in a solvent, e. g. pyridine, dimethylaniline, triethylamine, tri-n-butylamine, triamylamines, etc.

The following examples will serve to illustrate further the manner of practicing my invention.

*Example 1.—3'-carboxymethyl-1-ethyl-2,5-dimethylpyrrolothiacarbocyanine iodide*

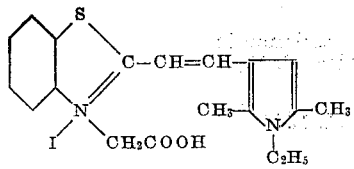

1.15 g. (1 mol.) of 2-methylbenzothiazole carboxymethobromide, .6 g. (1 mol.) of 1-ethyl-2,5-dimethyl-3-pyrrole carboxaldehyde and 15 cc. of absolute ethyl alcohol were refluxed together for 15 minutes. The orange mixture was cooled to room temperature and chilled to 0° C. The iodide of the dye which separated was collected on a filter, washed on the filter with water and acetone and dried. The yield of red crystals was 1.4 g., 75 per cent. After several recrystallizations from methyl alcohol (1000 cc. per gram of dye) the product was obtained as orange crystals melting with decomposition at 211–213° C. The yield of purified dye was .2 g., 11 per cent. The dye dissolves in alcohol to give a yellow solution which is bleached by Eastman Kodak Company's "D-76" photographic developer. The dye is a sensitizer for a gelatino-silver-bromoiodide photographic emulsion to 520 mµ with a maximum at 500 mµ.

*Example 2.—3-β-carboxyethyl-1'-cetyl-2',5'-dimethyloxapyrrolocarbocyanine iodide*

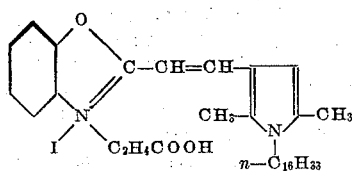

6.7 g. (1 mol.) of 2-methylbenzoxazole-β-carboxyethiodide, 6.9 g. (1 mol.) of 1-cetyl-2,5-dimethyl-3-pyrrolecarboxaldehyde and 50 cc. of absolute ethyl alcohol were boiled together under reflux for 5 minutes. The brownish yellow reaction mixture was cooled to room temperature, diluted to 500 cc. with water and the water solution decanted from the sticky precipitate. The residue was extracted with 100 cc. of hot acetone to remove tarry impurities and recrystallized from 50 cc. of absolute ethyl alcohol. The yield of yellow crystals was 1.2 g., 9 per cent. After a further crystallization from methyl alcohol (20 cc. per gram) the dye melted with decomposition at 182–184° C. The yield of purified dye was .7 g., 5 per cent. The dye dissolved in methyl alcohol to give a yellow solution which was bleached by Eastman Kodak Company's "D-76" photographic developer. The dye is a sensitizer to 500 mµ in a gelatino-silver-chlorobromoiodide photographic emulsion.

*Example 3.—Anhydro-5'-chloro-2,5-dimethyl-1-phenyl-3'-β-sulfoethylpyrrolothiacarbocyanine hydroxide*

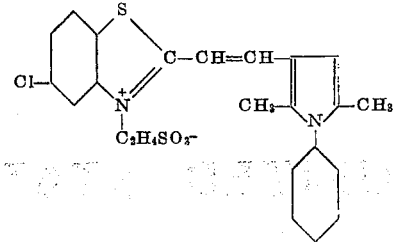

3.7 g. (1 mol.) of 5-chloro-2-methylbenzothiazole β-sulfoethyl bromide, 1.75 g. (1 mol.) of 2,5-dimethyl-1-phenyl-3-pyrrole carboxaldehyde and 25 cc. of pyridine were boiled together under reflux for 5 minutes. Orange crystals of dye separated out rapidly from the boiling reaction mixture. The mixture was chilled to 0° C., filtered and the product washed on the filter with methyl alcohol and water. The yield of brown crystals was .5 g., 10 per cent. After recrystallization from glacial acetic acid (350 cc. per gram) the dye was obtained as red flakes with a metallic luster. The dye melted above 330° C. The yield of purified material was .2 g., 4 per cent. The dye dissolved in methyl alcohol to give a yellow orange solution which was bleached by Eastman Kodak Company's "D-76" photographic developer. The dye gave some sensitization at 500 mµ in a gelatino-silver-chloro-bromoiodide photographic emulsion.

*Example 4.—1'-carboxymethyl-2,5-dimethyl-1-phenyl-3-pyrrolo-2'-carbocyanine bromide*

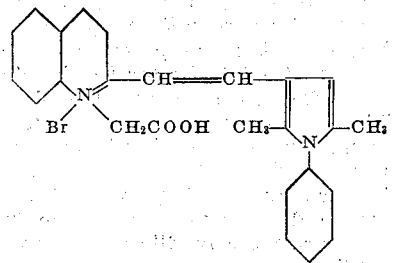

2.8 g. (1 mol.) of quinaldine carboxymethyl bromide, 2.0 g. (1 mol.) of 2,5-dimethyl-1-phenyl-3-pyrrolecarboxaldehyde, 1 cc. of pyridine and 25 cc. of absolute ethyl alcohol were refluxed together for 30 minutes. The orange reaction mixture was diluted with 100 cc. of dilute acetic acid, chilled to 0° C. and the dye collected on a filter. The dye was washed on the filter with acetone and water and dried. The yield of reddish crystals was .5 g., 11 per cent. After recrystallization from methyl alcohol (25 cc. per gram of dye) the dye was obtained in the form of orange crystals which melted at 196–198° C. with decomposition. The yield of purified material was .3 g., 6 per cent. The dye gave an orange solution in methyl alcohol which was bleached by Eastman Kodak Company's "D-76" photographic developer. The dye had no sensitizing action in a photographic silver halide emulsion.

*Example 5.—1'-carboxymethyl-2,5-dimethyl-1-phenyl-3-pyrrolo-4'-carbocyanine iodide*

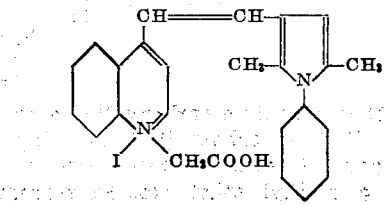

This dye was prepared in the same manner as the preceding example, using 2.8 g. of lepidine carboxymethyl bromide. The reaction mixture was poured in a solution of sodium iodide (excess) in 10 per cent (by weight) aqueous acetic acid. The mixture was chilled and the dye filtered off. The yield of crude dye was 1.9 g., 37 per cent. The dye was recrystallized from methyl alcohol (35 cc. per gram) and the purified product melted at 194–196° C. with decomposition. The yield of purple crystals of purified dye was 1.1 g., 21 per cent. The dye gave a pink methyl alcoholic solution which was bleached by Eastman Kodak Company's "D–76" photographic developer. The dye had no sensitizing action in a photographic emulsion.

In a manner similar to that disclosed in the above examples any of the pyrrolecarboxyaldehydes of Formula III can be condensed with any of the quaternary salts of Formulas IV and V.

The carboxyalkyl dye-bromides can be converted to the corresponding carboxyalkyl dye-perchlorates by treating a hot methyl alcoholic solution of the dye-bromide with a concentrated aqueous solution of sodium perchlorate. Dye-chlorides can be made from the carboxyalkyl dye-bromides or carboxyalkyl dye-iodides by stirring the dye-bromide or dye-iodide with a hot methyl alcoholic suspension of silver chloride, filtering off the silver salts, and isolating the carboxyalkyl dye-chloride from the methyl alcohol solution. Dye-thiocyanates and dye-acetates can be similarly prepared using silver thiocyanate or silver acetate.

The new dyes of my invention are useful as light-screening substances and can be employed in this respect, as described in United States Patent 2,298,731, dated October 13, 1942. As shown in the foregoing examples some of these dyes act to sensitize spectrally (optically) photographic silver halide emulsions.

For the preparation of overcoating layers, filter layers and anti-halation layers, using my dyes, from 50 mg. to 150 mg. of dye are dissolved in from 2 to 5 cc. of a water-miscible solvent. Methanol or acetone are suitable for this purpose but pyridine or the monoethyl ether of ethylene glycol can also be used. The solution is then added to about 25 cc. of a 5 per cent gelatin solution at 40° C. and the mixture coated on the support. The dye-chlorides are among the more soluble of my new dyes and well suited for the preparation of layers as described above.

To sensitize photographic silver halide emulsions with my new dyes, the following procedure is satisfactory. A quantity of the dye is dissolved in methyl alcohol or other suitable solvent, and a volume of this solution (which may be diluted with water) containing from 5 to 100 mg. of dye is slowly added to about 1000 cc. of gelatino-silver-halide emulsion with stirring. Stirring is continued until the dye is uniformly distributed throughout the emulsion. With most of my new sensitizing dyes, 10 to 20 mg. of dye per liter of emulsion suffices to produce the maximum sensitizing effect with the ordinary gelatino-silver-bromiodide emulsions. The above statements are only illustrative and are not to be understood as limiting my invention, as it will be apparent that these dyes can be incorporated by other methods in any of the photographic silver halide emulsions customarily employed in the art. For instance the dyes may be incorporated by bathing a plate or film upon which an emulsion has been coated in a solution of the dye in an appropriate solvent. Bathing methods, however, are not to be preferred ordinarily. Sensitization by means of my dyes is, of course, primarily directed to the ordinarily employed gelatino-silver-halide developing-out emulsions, e. g. chloride, iodochloride, chlorobromide, chlorobromoiodide, bromide and bromoiodide emulsions. The dyes are advantageously incorporated in the washed, finished emulsions.

The pyrrole carboxyaldehydes employed herein can be prepared by condensing formamide with a pyrrole base selected from those represented by the following general formula:

VI 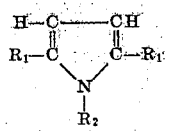

wherein $R_2$ and $R_3$ have the values given above, in the presence of phosphorus oxychloride, according to the method of Nenitzescu and Isacescu, Bull. Soc. Chim. Romania 11, 135 (1929). Details of this preparation are also given by Brooker and Sprague, Jour. Am. Chem. Soc. 67, 1869 (1945) and by Brooker and Sprague in United States Patent 2,409,612, dated October 22, 1946. The pyrrole bases of Formula VI can be prepared according to the process of Lions et al., Proc. Royal Soc., New South Wales 71, 92 (1937).

The quaternary salts containing a sulfo group can be prepared as described in my copending application Serial No. 736,405, filed of even date herewith. The carboxyalkyl quaternary salts can be prepared by known methods and also as described in my copending application Serial No. 736,405.

In the above general Formula I, the compounds wherein the total number of carbon atoms contained in the two groups, R and $R_2$ is from 4 to 18 are especially useful and in general Formula II, the compounds wherein the total number of carbon atoms contained in the two groups D and $R_2$ is from 4 to 18 are especially useful.

My new dyes can be converted to their salt forms by adding to the dyes, wet with a little water, methanol or ethanol, an alkali metal hydroxide, e. g. sodium or potassium hydroxide, or ammonium hydroxide, or an amine, e. g. methylamine, ethylamine, ethanolamine, diethanolamine, triethanolamine, pyridine, N-methylpiperidine, n-propylamine, isopropylamine, n-butylamine, β-ethoxyethylamine, etc. and taking up the salt which forms in a suitable solvent, e. g. water, methanol, ethanol or a mixture of water and methanol, a mixture of water and ethanol, etc. Such salt forms of the dyes can be used for the preparation of overcoating layers, filter layers and anti-halation layers as described above, or for the sensitization of emulsions as described above.

The composition of Eastman Kodak Company's "D–76" photographic developer is as follows:

| | |
|---|---|
| N-methyl-p-aminophenol sulfate (Elon) grams__ | 2.0 |
| Sodium sulfite, desiccated _____do____ | 100.0 |
| Hydroquinone _____do____ | 5.0 |
| Borax _____do____ | 2.0 |
| Water to make _____liter__ | 1.0 |

What I claim as my invention and desire to

What I claim as my invention and desire to be secured by Letters Patent of the United States is:

1. The pyrrolocyanine dyes which are represented by the following general formula:

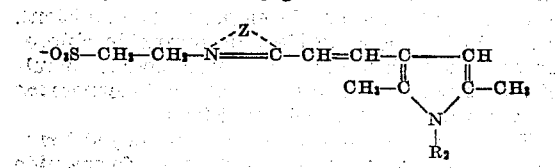

wherein $R_2$ represents a hydrocarbon radical containing from 2 to 16 carbon atoms and Z represents the non-metallic atoms necessary to complete a benzothiazole nucleus.

2. The pyrrolocyanine dye which is represented by the following formula:

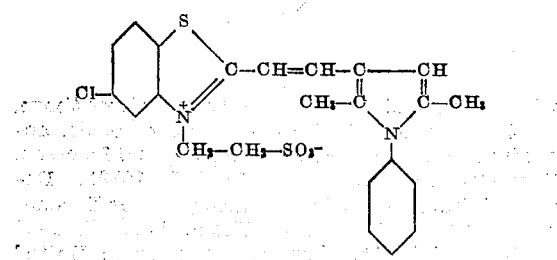

3. The pyrrolocyanine dyes which are represented by the following general formula:

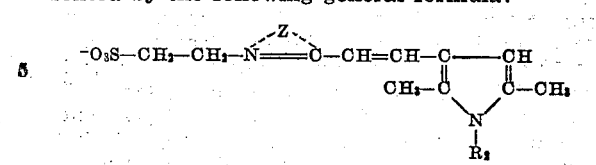

wherein $R_2$ represents a hydrocarbon radical of the benzene series containing not more than 16 carbon atoms and Z represents the non-metallic atoms necessary to complete a benzothiazole nucleus.

ROBERT H. SPRAGUE.

REFERENCES CITED

The following references are of record in the file of this patent:

UNITED STATES PATENTS

| Number | Name | Date |
|---|---|---|
| 2,170,806 | Brooker | Aug. 29, 1939 |
| 2,170,807 | Brooker | Aug. 29, 1939 |
| 2,268,798 | Brooker | Jan. 6, 1942 |
| 2,298,731 | Brooker | Oct. 13, 1942 |
| 2,320,654 | Reister | June 1, 1943 |
| 2,338,782 | Reister | Jan. 11, 1944 |
| 2,430,558 | Carroll | Nov. 11, 1947 |